(12) United States Patent
Nishibun et al.

(10) Patent No.: US 10,501,273 B2
(45) Date of Patent: Dec. 10, 2019

(54) WORKPIECE TRANSFER APPARATUS AND WORKPIECE TRANSFER METHOD

(71) Applicant: TOYOTA BOSHOKU KABUSHIKI KAISHA, Aichi-ken (JP)

(72) Inventors: Takahiko Nishibun, Chita (JP); Takuya Haraguchi, Nagoya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/029,882

(22) Filed: Jul. 9, 2018

(65) Prior Publication Data

US 2019/0030688 A1 Jan. 31, 2019

(30) Foreign Application Priority Data

Jul. 31, 2017 (JP) .................................. 2017-147820

(51) Int. Cl.
| | |
|---|---|
| *B65H 3/08* | (2006.01) |
| *B65G 59/02* | (2006.01) |
| *B65H 3/14* | (2006.01) |

(52) U.S. Cl.
CPC ........... *B65H 3/0816* (2013.01); *B65G 59/02* (2013.01); *B65H 3/14* (2013.01); *B65G 2201/02* (2013.01); *B65G 2814/031* (2013.01); *B65H 2406/12* (2013.01); *B65H 2406/122* (2013.01)

(58) Field of Classification Search
CPC .... B65H 3/0816; B65H 3/14; B65H 2406/12; B65H 2406/122; B65G 59/02; B65G 59/045; B65G 2814/031
USPC .................................. 271/11, 12, 13, 97, 98
See application file for complete search history.

(56) References Cited

U.S. PATENT DOCUMENTS

| | | | | |
|---|---|---|---|---|
| 3,409,149 A | * | 11/1968 | Graux ................. | B65G 59/045 271/11 |
| 3,411,770 A | * | 11/1968 | Albright ................. | B65H 3/14 271/97 |
| 2006/0138793 A1 | * | 6/2006 | Tanae ..................... | B65G 47/91 294/64.3 |

FOREIGN PATENT DOCUMENTS

JP 2012-142491 7/2012

* cited by examiner

*Primary Examiner* — David H Bollinger
(74) *Attorney, Agent, or Firm* — Greenblum & Bernstein, P.L.C.

(57) ABSTRACT

A workpiece transfer apparatus includes a mounting surface, a non-contact chuck, and an extracting mechanism. The mounting surface receives workpieces stacked one above the other. The non-contact chuck is located above the workpieces to draw the uppermost workpiece. The extracting mechanism extracts the uppermost workpiece drawn by the chuck by laterally sliding the uppermost workpiece in a predetermined extracting direction.

6 Claims, 6 Drawing Sheets

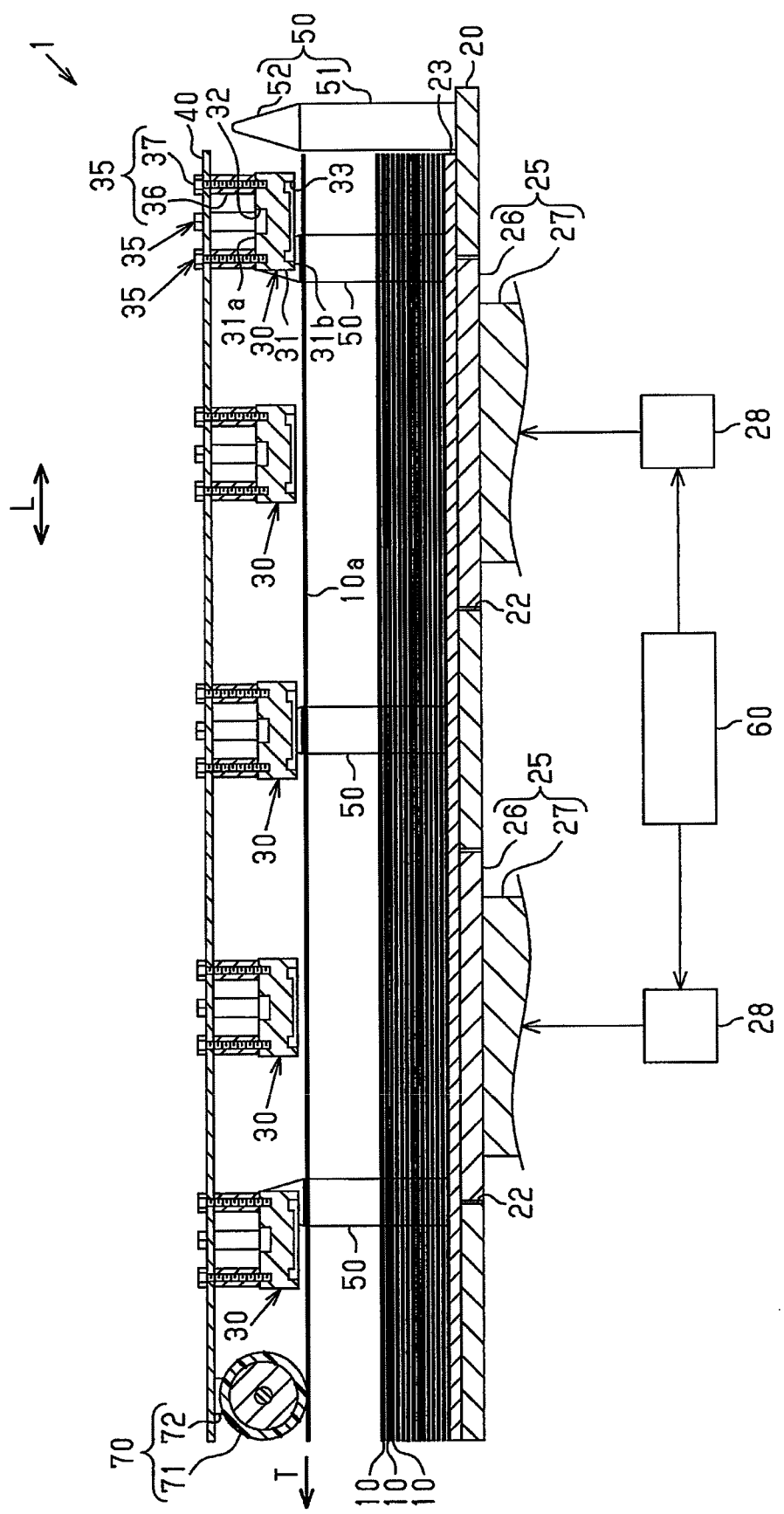

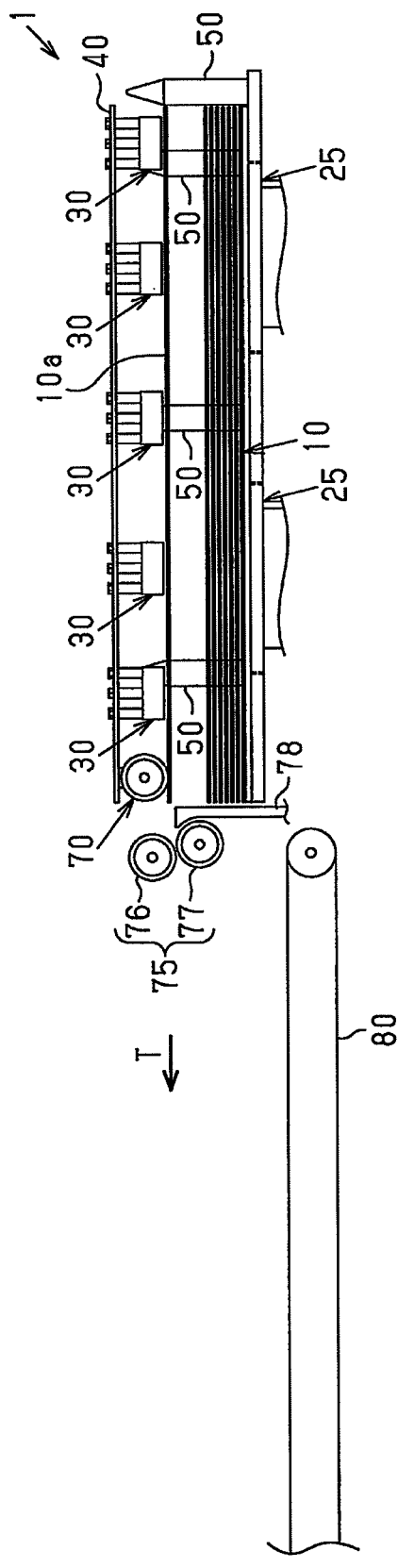
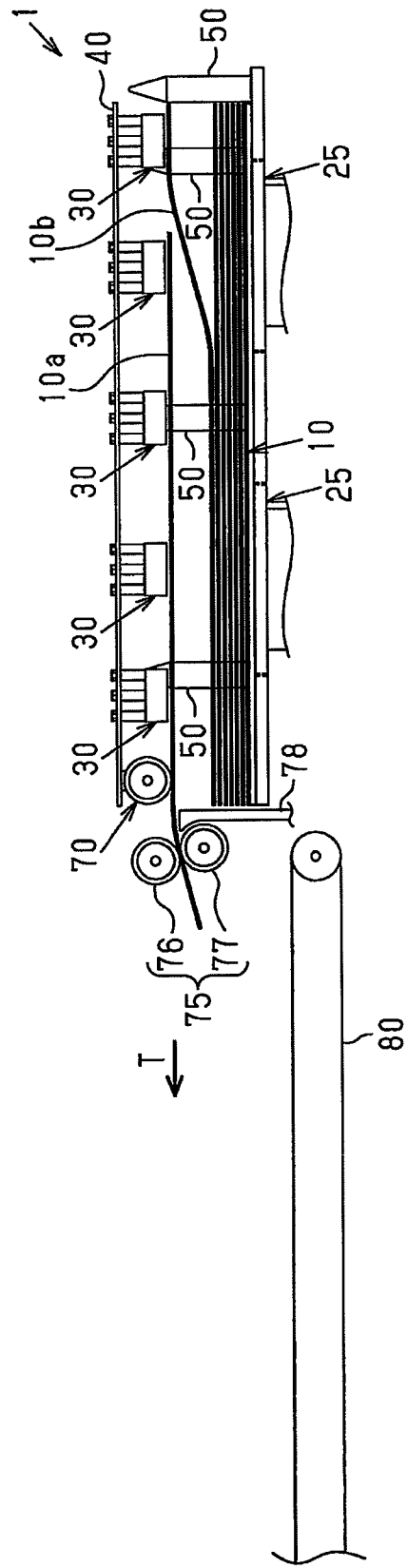

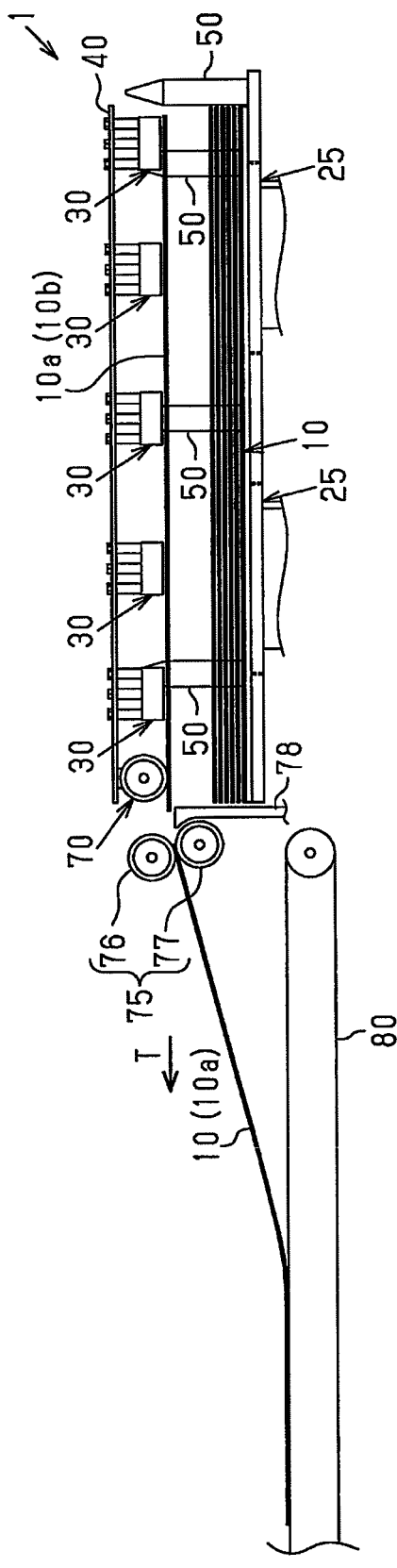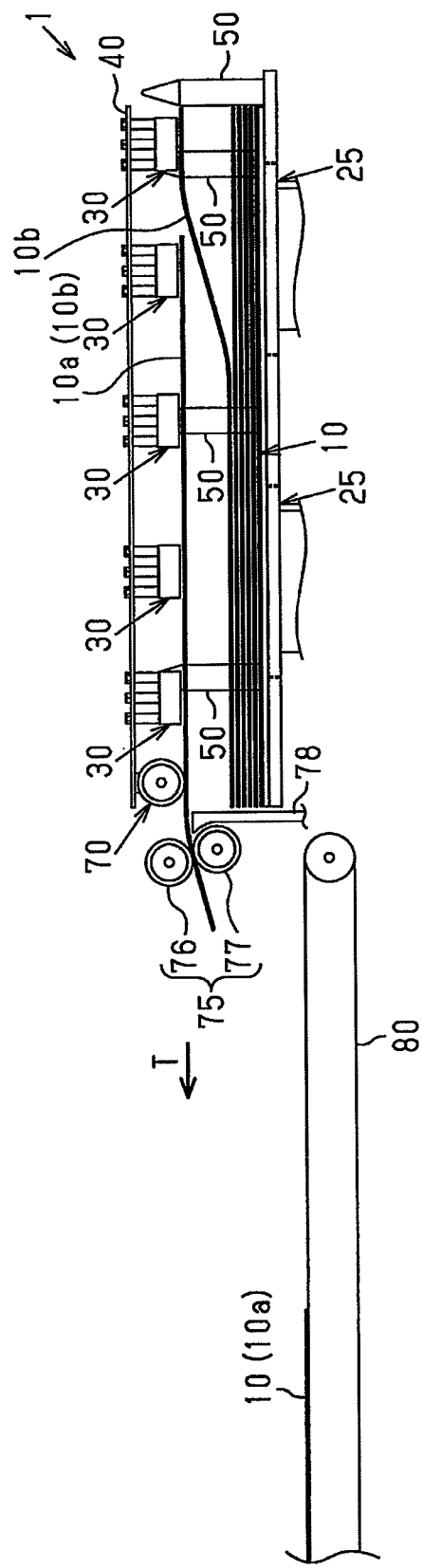

WORKPIECE TRANSFER APPARATUS AND WORKPIECE TRANSFER METHOD

BACKGROUND

The present disclosure relates to an apparatus and a method for transferring multiple workpieces stacked one above the other on a mounting surface in order from the top.

Conventionally, an apparatus that includes a base member, to which non-contact chucks are mounted, and a moving mechanism, which moves the base member, and a method that uses the apparatus have been proposed (for example, refer to Japanese Laid-Open Patent Publication No. 2012-142491). The non-contact chucks disclosed in the above publication are called Bernoulli chucks, which eject high-pressure air in a radial pattern from multiple ejection ports provided on the suction surface of each chuck. With this configuration, air is discharged from the gap between the suction surface of each chuck and the workpiece toward the outer periphery, and the airflow generates a negative pressure in the central section. The above-described chuck draws the workpiece without contact by utilizing the negative pressure.

In the apparatus disclosed in Japanese Laid-Open Patent Publication No. 2012-142491, the non-contact chucks draw the uppermost one of multiple workpieces stacked one above the other, and a moving mechanism such as a parallel mechanism robot moves the base member, to which the chucks are mounted, to transfer the workpiece.

SUMMARY

In the apparatus and method disclosed in Japanese Laid-Open Patent Publication No. 2012-142491, the base member, to which the non-contact chucks that draw the workpiece are mounted, is moved by the moving mechanism such as a parallel mechanism robot. Thus, after completing transfer of the uppermost workpiece, the next workpiece cannot be drawn until the moving mechanism and the base member (chucks) return to the original drawing position. For this reason, there is a limit in reducing the time required from when the uppermost workpiece starts to be transferred until when the workpiece located immediately below starts to be transferred.

Accordingly, it is an objective of the present invention to provide a workpiece transfer apparatus and a workpiece transfer method that reduce the time required for transferring workpieces.

In accordance with one aspect of the present invention, a workpiece transfer apparatus is provided that includes a mounting surface for receiving a plurality of workpieces stacked one above the other, a non-contact chuck located above the workpieces to draw an uppermost workpiece, and an extracting mechanism, which extracts the uppermost workpiece drawn by the chuck by laterally sliding the uppermost workpiece in a predetermined extracting direction.

In accordance with another aspect of the present invention, a method for transferring a plurality of workpieces stacked one above the other on a mounting surface in order from the top is provided. The method includes: drawing an uppermost workpiece using a non-contact chuck; and extracting the uppermost workpiece drawn by the chuck in an extracting direction by laterally sliding the uppermost workpiece.

Other aspects and advantages of the present invention will become apparent from the following description, taken in conjunction with the accompanying drawings, illustrating by way of example the principles of the invention.

BRIEF DESCRIPTION OF THE DRAWINGS

FIG. 2 is a cross-sectional view taken along line 2-2 of FIG. 1.

FIGS. 3A, 3B, 4A, and 4B are side views illustrating the steps for transferring workpieces with the workpiece transfer apparatus of FIG. 1 in order of time.

DETAILED DESCRIPTION OF THE PREFERRED EMBODIMENT

A workpiece transfer apparatus and a workpiece transfer method according to one embodiment will now be described with reference to FIGS. 1 to 5.

Figure 1:
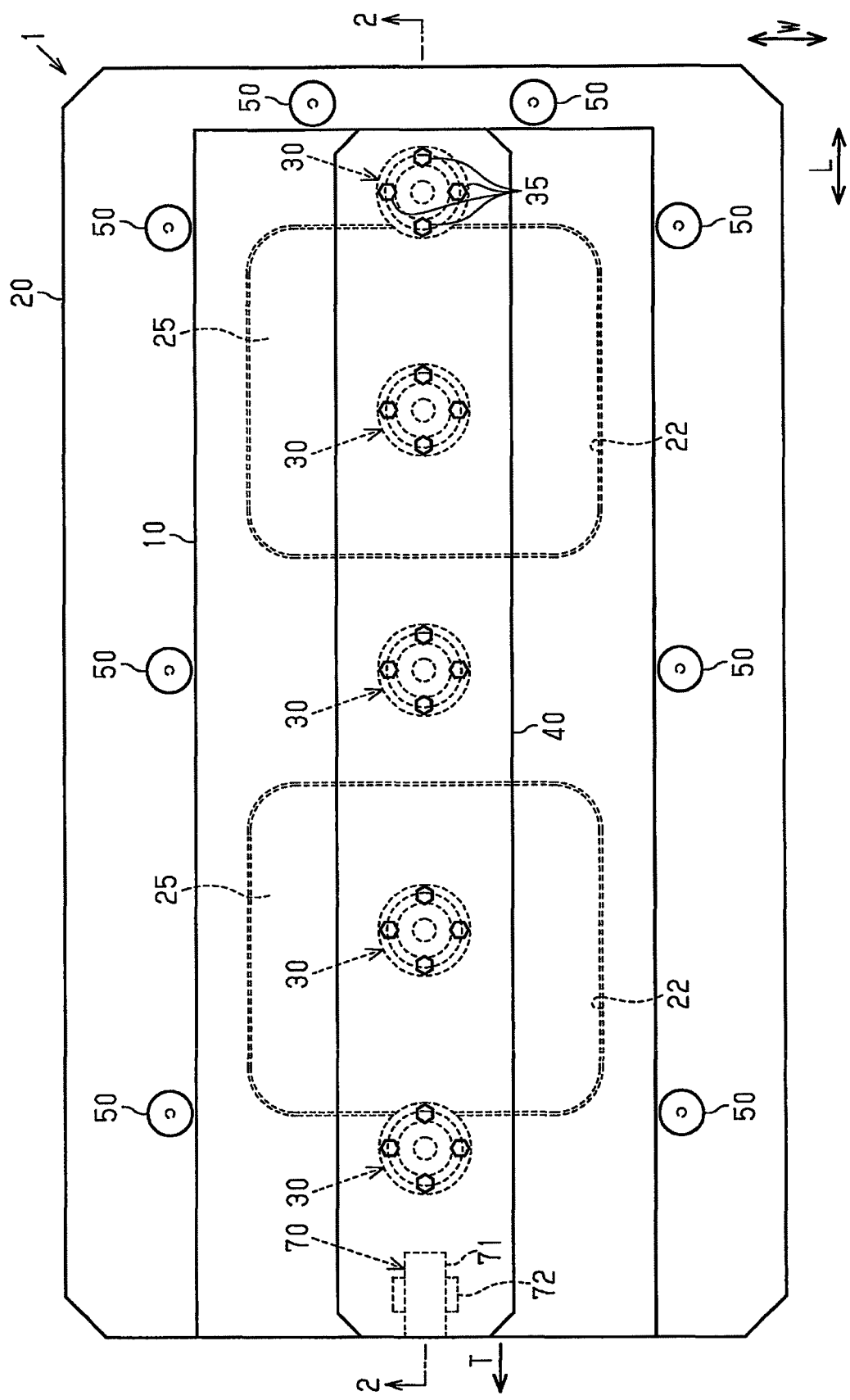
FIG. 1 is a plan view of a workpiece transfer apparatus according to one embodiment.

As shown in FIGS. 1 and 2, a workpiece transfer apparatus (hereinafter, referred to as the transfer apparatus 1) transfers workpieces 10, which are metal thin plates in this embodiment. The metal thin plates are, for example, material for a separator of a fuel cell. The transfer apparatus 1 includes a base plate 20 and non-contact chucks 30. The workpieces 10 that are stacked one above the other are placed on the base plate 20. The chucks 30 are located above the base plate 20 and draw the uppermost workpiece 10a. The transfer apparatus 1 also includes an extracting mechanism 70, which laterally slides the uppermost workpiece 10a that is drawn by the chucks 30 in a predetermined extracting direction T to extract the uppermost workpiece 10a.

For example, each workpiece 10 has a thickness of approximately 0.1 mm, is rectangular in a plan view, and is made of stainless-steel.

Next, the structure of the components of the transfer apparatus 1 will be described in detail.

<Base Plate 20>

As shown in FIG. 1, the base plate 20 is a plate-like member that is rectangular in a plan view. Hereinafter, the direction in which the long sides of the base plate 20 extend will be referred to as a longitudinal direction L, and the direction in which the short sides of the base plate 20 extend will be referred to as a width direction W.

The workpieces 10 are placed on the upper surface of the base plate 20 in such a manner that the longitudinal direction of each workpiece 10 extends in the longitudinal direction L.

As shown in FIGS. 1 and 2, two through-holes 22 are formed in the center section of the base plate 20 in the width direction W and are spaced apart in the longitudinal direction L. The through-holes 22 are substantially quadrangular in a plan view.

<Lifting Table 25>

As shown in FIGS. 1 and 2, a lifting table (displacing mechanism) 25 is located inside each through-hole 22. The lifting tables 25 are capable of being displaced in a vertical direction. Each lifting table 25 includes a leg portion 27, which extends in the vertical direction, and a top plate 26, which is substantially rectangular in a plan view. The top plate 26 is coupled to the upper end of the leg portion 27 and has a slightly smaller outside shape than the through-holes 22 of the base plate 20. Actuators 28 are each coupled to the corresponding leg portion 27 to displace the leg portion 27 in the vertical direction. The actuators 28 are controlled by an electronic control unit 60, which will be discussed below.

As shown in FIG. 2, a support plate 23 is placed over the upper surfaces of the top plates 26 of the lifting tables 25 and the upper surface of the base plate 20. The lengths of the support plate 23 in the longitudinal direction L and the width direction W are substantially the same as those of the workpieces 10. The workpieces 10 are placed on the upper surface (mounting surface) of the support plate 23.

Figure 5:
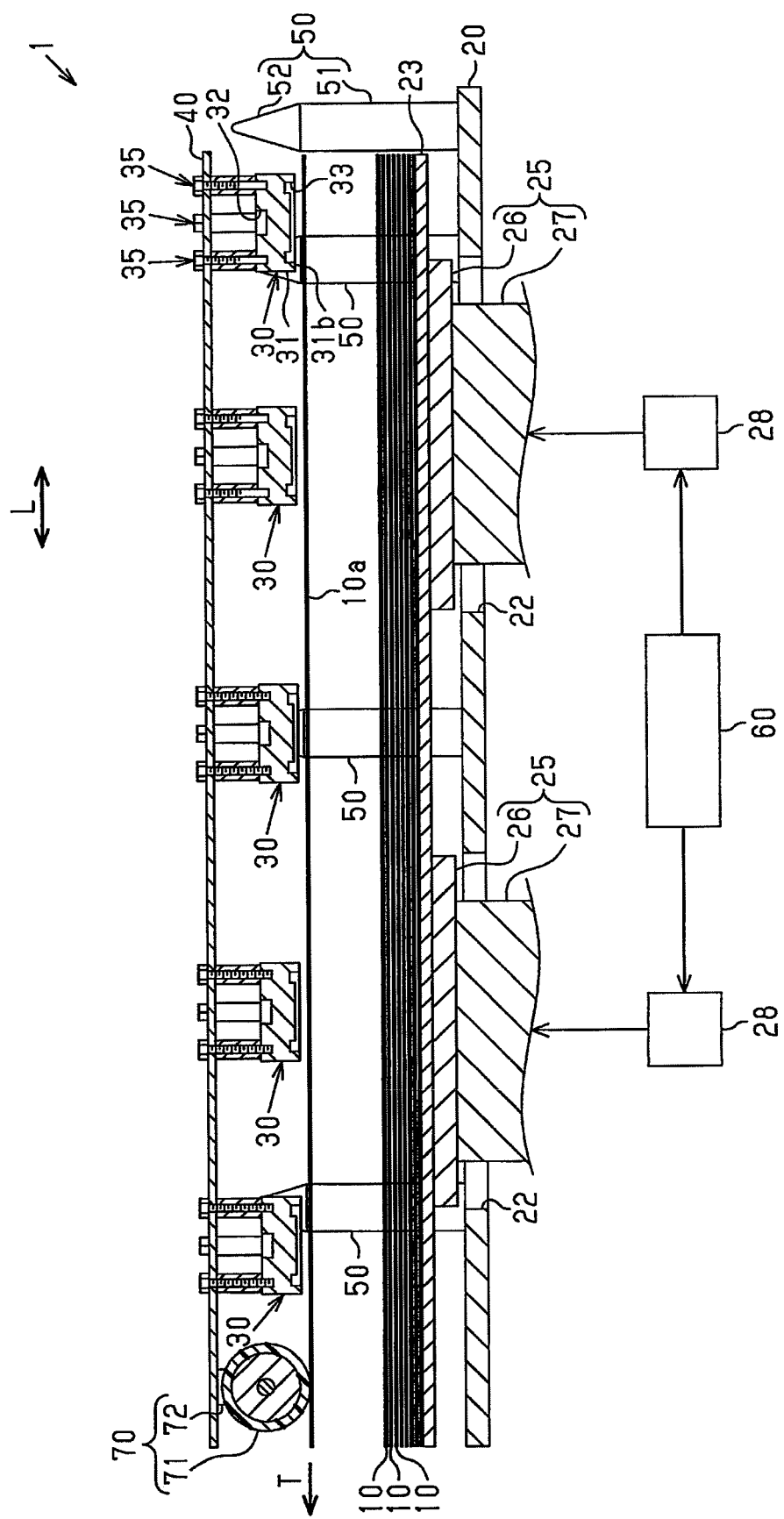
FIG. 5 is a cross-sectional view corresponding to FIG. 2 illustrating a state in which the top plates of the lifting tables are located above the base plate.

The support plate 23 has a thickness sufficient to prevent the workpieces 10 from being deformed by their own weight when the top plates 26 of the lifting tables 25 are lifted as shown in FIG. 5.

<Chuck 30>

As shown in FIGS. 1 and 2, a chuck mounting base 40 is provided above the base plate 20. The chuck mounting base 40 is a rectangular plate in a plan view, is located at the center of the base plate 20 in the width direction W, and extends in the longitudinal direction L.

Multiple (five in the present embodiment) chucks 30 are mounted on the chuck mounting base 40 and are spaced apart from each other in the longitudinal direction L. Of the five chucks 30, the chuck 30 at the center is located between the above-mentioned two through-holes 22. Furthermore, the two chucks 30 adjacent to the above-described center chuck 30 are located directly above the substantially center positions of the through-holes 22. Additionally, the two chucks 30 located at both ends are outward of the through-holes 22 in the longitudinal direction L.

As shown in FIG. 2, the chucks 30, which are Bernoulli chucks in this embodiment, are mounted on the chuck mounting base 40, and each chuck 30 includes four mounting portions 35, which extend downward, and a cylindrical chuck main body 31, which is coupled to the lower ends of the mounting portions 35.

Each mounting portion 35 of the chuck 30 includes a bolt 37 and a cylindrical collar 36. The bolt 37 is inserted through an insertion hole extending vertically through the chuck mounting base 40 from above. The cylindrical collar 36 is located between the lower surface of the chuck mounting base 40 and the upper surface of the chuck main body 31. The bolt 37 is inserted in the cylindrical collar 36. The distal ends of the bolts 37 are screwed to four bolt holes formed in the upper surface of the chuck main body 31 so that the chuck main body 31 is coupled to the chuck mounting base 40 with the mounting portions 35.

A supply port 32 is provided in an upper surface 31a of the chuck main body 31. The supply port 32 supplies air from an air pipe (not shown) to the inside of the chuck main body 31.

An annular groove 33 is provided in a lower surface 31b of the chuck main body 31. Multiple ejection ports (not shown) are provided in the inner circumferential surface of the annular groove 33. The ejection ports communicate with the supply port 32 and eject high-pressure air in a radial pattern.

High-pressure air is ejected in a radial pattern from the ejection ports provided on the lower surface 31b of the chuck main body 31, that is, the suction surface. This causes air to be discharged from the gap between the lower surface 31b of the chuck main body 31 and the workpiece 10 toward the outer periphery. Such an airflow generates a negative pressure in the central section. The chuck 30 utilizes the negative pressure to draw the workpiece 10 in a non-contact manner.

At this time, the force that draws the workpiece 10 toward the lower surface 31b of the chuck main body 31 by the negative pressure balances with the weight of the workpiece 10 in the vertical direction. Thus, the workpiece 10 is retained without touching the chuck main body 31. The use of the non-contact chucks 30 reduces deformation, contamination, and damage that might otherwise be caused when the workpiece 10 is extracted.

Conventionally, a typical chuck includes a pad located at the central section of the suction surface, that is, the lower surface of the chuck main body (refer to Japanese Laid-Open Patent Publication No. 2012-142491) to prevent lateral sliding of the workpiece 10.

In contrast, the present embodiment does not include any member corresponding to the pad. With this configuration, in extracting the uppermost workpiece 10a that is drawn by the chucks 30, the workpiece 10a is easily slid laterally since no retaining force in the horizontal direction acts on the workpiece 10a.

<Blocking Pole 50>

As shown in FIGS. 1 and 2, multiple blocking poles (blocking members) 50 are provided on the outer peripheral portion of the upper surface of the base plate 20. The blocking poles 50 determine the position of the workpieces 10 placed on the support plate 23 in the horizontal direction and prevent the uppermost workpiece 10a retained by the chucks 30 from sliding laterally in a direction different from the extracting direction T.

As shown in FIG. 1, the blocking poles 50 are arranged in a U-shape such that only the extracting direction T, which is one end of the base plate 20 in the longitudinal direction L, is open. That is, two blocking poles 50 are provided at one end of the base plate 20 in the longitudinal direction L (right end in the drawing). The two blocking poles 50 are located adjacent to the workpiece 10 and are spaced apart in the width direction W. Additionally, three blocking poles 50 are located on both sides of the base plate 20 in the width direction W (the upper side and the lower side in the drawing). The three blocking poles 50 are located adjacent to the workpiece 10 and are spaced apart from each other in the longitudinal direction L.

As shown in FIG. 2, each blocking pole 50 includes a cylindrical column 51, which extends upward from the upper surface of the base plate 20, and a substantially conical portion 52, which projects upward from the column 51. The outer diameter of the section of the column 51 located above the upper surface of the base plate 20 is constant. In the present embodiment, the blocking poles 50 extend above the lower surfaces 31b of the chucks 30.

<Electronic Control Unit 60>

The electronic control unit 60 controls the actuators 28 to change the height of the top plates 26 of the lifting tables 25.

The electronic control unit 60 drives the actuators 28 to lift the lifting tables 25 based on the number of the remaining workpieces 10 on the support plate 23 in such a manner that the distance between the uppermost workpiece 10a and the lower surfaces 31b of the chucks 30 is within a predetermined range that allows the uppermost workpiece 10a to be drawn. The electronic control unit 60, for example, counts the number of the transferred workpieces 10 and subtracts the number of the transferred workpieces 10 from the total number of the workpieces 10 originally placed on the support plate 23 to gain the remaining number of the workpieces 10. The top plates 26 of the lifting tables 25 are lifted by a predetermined distance each time a predetermined number (one or more) of the workpieces 10 are transferred.

<Extracting Mechanism 70>

As shown in FIGS. 2, 3A, and 3B, the extracting mechanism 70 is provided on one of the ends of the chuck mounting base 40 in the longitudinal direction L, that is, on the downstream end in the extracting direction T. The extracting mechanism 70 extracts the uppermost workpiece 10a drawn by the chucks 30 in the horizontal direction.

The extracting mechanism 70 includes a support 72, which is mounted on the chuck mounting base 40 and projects downward, and an extracting roller (actuator) 71, which is rotationally supported by the support 72. The extracting roller 71 is located in such a manner that the lower surface aligns with the upper surface of the workpiece 10a drawn by the chucks 30. When the extracting roller 71 is rotated by the electric motor (not shown), the workpiece 10a drawn by the chucks 30 is extracted in the extracting direction T (leftward in the drawing).

Conveying rollers 75 are provided forward, that is, downstream of the extracting roller 71 in the extracting direction T. The conveying rollers 75 convey the workpiece 10a extracted by the extracting roller 71 to a conveyor belt 80 located forward. In the present embodiment, the conveyor belt 80 is located lower than the conveying rollers 75.

The conveying rollers 75 include an upper roller 76 and a lower roller 77, which are located to face each other and rotated in the opposite directions. The upper surface of the lower roller 77 is located lower than the lower surface of the extracting roller 71.

A guide member 78 is provided between the extracting roller 71 and the lower roller 77 in the extracting direction T. The guide member 78 guides the workpiece 10a to the conveying rollers 75 by preventing the front end of the workpiece 10a from sagging down when the workpiece 10a moves toward the lower roller 77 from the extracting roller 71. The upper end of the guide member 78 is located between the lower surface of the extracting roller 71 and the upper surface of the lower roller 77 and extends in the width direction W.

An operation of the present embodiment will now be described.

The multiple workpieces 10 stacked one above the other on the support plate 23 are transferred onto the conveyor belt 80 as follows.

As shown in FIG. 3A, first, the uppermost workpiece 10a of the multiple workpieces 10 is drawn by the chucks 30. The drawn workpiece 10a is slidingly extracted in the extracting direction T by the extracting roller 71 that is rotated.

Subsequently, as shown in FIG. 3B, the extracted workpiece 10a is guided between the upper roller 76 and the lower roller 77 of the conveying rollers 75.

Subsequently, as shown in FIG. 4A, the workpiece 10a is conveyed onto the conveyor belt 80 by the conveying rollers 75 and is conveyed to the next step (not shown) by the conveyor belt 80.

As shown in FIG. 3B, the workpiece 10b located immediately below the uppermost workpiece 10a starts to face the chucks 30 in order from the upstream section of the workpiece 10b in the extracting direction T as the uppermost workpiece 10a is extracted. Since the workpiece 10 is flexible, the section that has faced the chuck 30 flexes as it is drawn toward the chuck 30.

As shown in FIG. 4A, when the previous workpiece 10a is completely extracted from the drawing position directly below the chucks 30 and the extracting roller 71, the next workpiece 10b is entirely drawn by the chucks 30.

Subsequently, transfer of the workpiece 10 is repeatedly executed in the order shown in FIGS. 3B, 4A, and 4B.

When the transfer of the workpieces 10 proceeds, the remaining number of the workpieces 10 on the support plate 23 is reduced, and the distance between the uppermost workpiece 10a and the lower surfaces 31b of the chucks 30 is increased. The greater the distance between the uppermost workpiece 10a and the lower surfaces 31b of the chucks 30, the more difficult it becomes to stably draw the workpiece 10 by the chucks 30.

In the present embodiment, the actuators 28 are driven by the electronic control unit 60 to lift the top plates 26 of the lifting tables 25, and thus the support plate 23, as shown in FIG. 5. Therefore, the distance between the uppermost workpiece 10a and the lower surfaces 31b of the chucks 30 is maintained within the above-described predetermined range. With this configuration, the workpiece 10 is stably drawn regardless of the remaining number of the workpieces 10.

The workpiece transfer apparatus and the workpiece transfer method of the present embodiment have the following advantages.

(1) The transfer apparatus 1 is located above the workpieces 10 and includes the non-contact chucks 30, which lift the uppermost workpiece 10a, and the extracting mechanism 70, which extracts the uppermost workpiece 10a that is lifted by the chucks 30 by laterally sliding the uppermost workpiece 10a in the extracting direction T.

With this configuration, the uppermost workpiece 10a of the workpieces 10 stacked one above the other on the support plate 23 is drawn by the non-contact chucks 30. Subsequently, the uppermost workpiece 10a is laterally slid by the extracting mechanism 70 in the extracting direction T. According to the above configuration, the chucks 30 lift the uppermost workpiece 10a, and the extracting mechanism 70, which extracts the workpieces 10, is provided separately from the chucks 30. Thus, immediately after extracting the uppermost workpiece 10a drawn by the chucks 30, the workpiece 10b located immediately below is drawn by the chucks 30. This reduces the time required to transfer the workpieces 10.

(2) The chucks 30 are spaced apart from each other in the extracting direction T.

With this configuration, the workpiece 10 is drawn by the chucks 30, which are spaced apart from each other in the above-described extracting direction T. Thus, even if the workpiece 10 is long in the extracting direction T, the workpiece 10 is drawn by the chucks 30 in a stable manner.

Additionally, since the workpiece 10 is flexible, the workpiece 10b located immediately below the uppermost workpiece 10a starts to face the chucks 30 in order from the upstream section of the workpiece 10b in the extracting direction T as the uppermost workpiece 10a is extracted, and the section that has faced the chuck 30 flexes as it is drawn toward the chuck 30.

Thus, drawing of the entire workpiece 10b located immediately below the uppermost workpiece 10a is completed immediately after completing the extraction of the uppermost workpiece 10a. This allows the extraction of the workpiece 10b to be started at an early stage. This further reduces the time required to transfer the workpieces 10.

(3) The blocking poles 50 are located adjacent to the workpieces 10. The blocking poles 50 extend over a distance between the upper surface (mounting surface) of the support plate 23 and the lower surfaces 31b of the chucks 30. The blocking poles 50 prevent the uppermost workpiece 10a from sliding laterally in a direction different from the extracting direction T.

With this configuration, the uppermost workpiece 10a drawn by the chucks 30 is prevented from being displaced in a direction different from the extracting direction T. Thus, the workpieces 10 are reliably extracted in the extracting direction T.

(4) The transfer apparatus 1 includes the lifting tables 25, which lift the support plate 23 in such a manner that the distance between the uppermost workpiece 10a and the lower surfaces 31b of the chucks 30 is within the predetermined range that allows the uppermost workpiece 10a to be drawn.

With this configuration, the support plate 23 is lifted by the lifting tables 25 to maintain the distance between the uppermost workpiece 10a and the lower surfaces 31b of the chucks 30 within the above-described predetermined range. Thus, each workpiece 10 is stably drawn regardless of the remaining number of the workpieces 10.

(5) The extracting mechanism 70 includes the extracting roller 71, which extracts the uppermost workpiece 10a in the horizontal direction.

With this configuration, the uppermost workpiece 10a drawn by the chucks 30 is extracted in the horizontal direction by the extracting roller 71. Thus, it is only required that the lower surfaces of the chucks 30 be arranged to be level with each other. That is, the manner in which the chucks 30 are arranged is simplified.

(6) The uppermost workpiece 10a is drawn using the non-contact chucks 30, and the uppermost workpiece 10a drawn by the chucks 30 is extracted by laterally sliding the uppermost workpiece 10a in the extracting direction T.

This configuration has the same operational advantage as the above-described advantage (1).

<Modifications>

The above described embodiment may be modified as follows.

Figure 6:
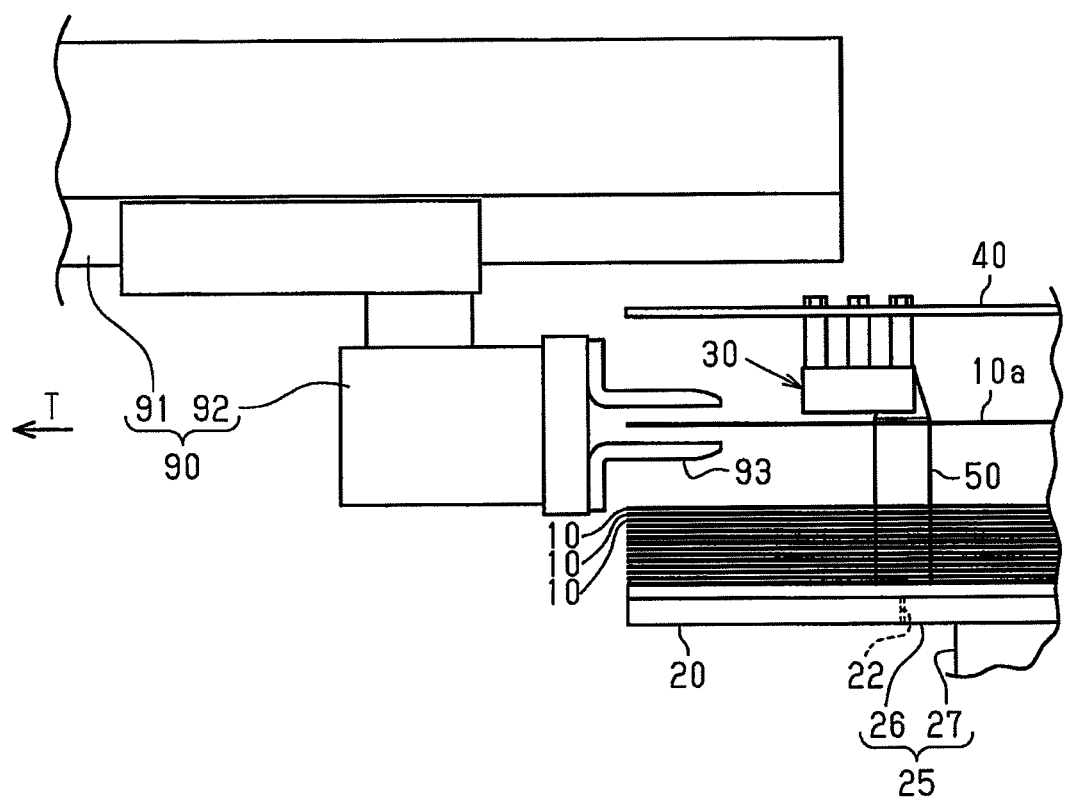
FIG. 6 is a side view of an extracting mechanism and the surrounding structure according to a modified embodiment.

As shown in FIG. 6, an extracting mechanism 90 may be employed that includes a guide rail 91, which extends in the extracting direction T, and an electric gripper (actuator) 92. The electric gripper 92 is supported by the guide rail 91 to be movable in the extracting direction T and includes a claw portion 93, which holds the uppermost workpiece 10a drawn by the chucks 30. In this case, the distance in which the extracting mechanism, which is the electric gripper 92 in this modification, reciprocates is reduced. This reduces the time required for transferring the workpieces 10.

The chucks 30 may be arranged in such a manner that when the uppermost workpiece 10a is drawn by the chucks 30, the workpiece 10a is tilted downward toward the downstream end of the extracting direction T. In this case, the workpiece 10a is extracted by utilizing the lateral sliding of the workpiece 10 by its own weight. Additionally, a movable stopper may be provided forward of the workpiece 10a in the extracting direction T. The point in time at which the workpiece 10a is extracted by the lateral sliding of the workpiece 10a is controlled by selectively opening and closing the stopper.

The number of the extracting roller 71 and/or the conveying rollers 75 may be increased so as to be arranged along the extracting direction T.

The number of the extracting rollers 71 and/or the conveying rollers 75 may be increased so as to be arranged along the width direction W. In this case, the extracting rollers 71 or the conveying rollers 75 are preferably arranged to touch both edges of each workpiece 10 in the width direction W to prevent the extracting rollers 71 or the conveying rollers 75 from touching the inner section of the workpiece 10, that is, the section on which passages of a separator of a fuel cell are formed.

The lifting mechanism of the present invention is not limited to the lifting tables 25. For example, the lifting mechanism may be configured to lift the base plate 20 or may be configured to lift the chuck mounting base 40. In other words, any configuration may be employed as long as at least one of the support plate 23 and the group of the lower surfaces of the chucks 30 is displaced to keep the distance between the uppermost workpiece 10a and the lower surfaces of the chucks 30 within the predetermined range that allows the uppermost workpiece 10a to be drawn.

The number and the shape of the blocking poles 50 may be changed as required. The blocking member is not limited to columnar members but may be a wall, for example.

The blocking member may be secured to a member other than the base plate 20 such as the chuck mounting base 40.

The chucks 30 may be provided to be spaced apart in the width direction W.

The workpiece transferred by the transfer apparatus 1 may be a thin plate other than the material for the separator of the fuel cell. Alternatively, the workpiece may be a thin plate made of plastic.

Therefore, the present examples and embodiments are to be considered as illustrative and not restrictive and the invention is not to be limited to the details given herein, but may be modified within the scope and equivalence of the appended claims.

The invention claimed is:

1. A workpiece transfer apparatus comprising:
a mounting surface for receiving a plurality of workpieces stacked one above the other;
a non-contact chuck located above the workpieces to draw an uppermost workpiece; and
a roller or a gripper configured to extract the uppermost workpiece drawn by the chuck by laterally sliding the uppermost workpiece in a predetermined extracting direction.

2. The workpiece transfer apparatus according to claim 1, wherein the chuck is one of a plurality of chucks that are arranged in the extracting direction and are spaced apart from each other.

3. The workpiece transfer apparatus according to claim 1, further comprising a blocking member located adjacent to the workpieces, wherein
the blocking member extends over a distance between the mounting surface and a lower surface of the chuck, and
the blocking member restricts the uppermost workpiece from laterally sliding in a direction different from the extracting direction.

4. The workpiece transfer apparatus according to claim 1, further comprising a displacing mechanism, which selectively lifts and lowers at least one of the mounting surface and a lower surface of the chuck in such a manner that the distance between the uppermost workpiece and the lower surface of the chuck is within a predetermined range that allows the uppermost workpiece to be drawn.

5. The workpiece transfer apparatus according to claim 1, wherein the roller or the gripper is further configured to extract the uppermost workpiece in a horizontal direction.

6. A method for transferring a plurality of workpieces stacked one above the other on a mounting surface in order from the top, the method comprising:
- drawing an uppermost workpiece using a non-contact chuck; and
- extracting the uppermost workpiece drawn by the chuck in an extracting direction by laterally sliding the uppermost workpiece using a roller or a gripper.

* * * * *